United States Patent
Rowe, Jr.

(10) Patent No.: US 8,849,604 B2
(45) Date of Patent: Sep. 30, 2014

(54) METHOD FOR CALCULATING THE PROBABILITY OF MOISTURE BUILD-UP IN A COMPRESSOR

(75) Inventor: David F. Rowe, Jr., Clemmons, NC (US)

(73) Assignee: Clark Equipment Company, Statesville, NC (US)

( * ) Notice: Subject to any disclaimer, the term of this patent is extended or adjusted under 35 U.S.C. 154(b) by 632 days.

(21) Appl. No.: 13/114,173

(22) Filed: May 24, 2011

(65) Prior Publication Data

US 2012/0303311 A1    Nov. 29, 2012

(51) Int. Cl.
| | |
|---|---|
| G01K 7/00 | (2006.01) |
| F04C 28/28 | (2006.01) |
| G06F 1/20 | (2006.01) |
| F04C 28/08 | (2006.01) |
| G01K 1/02 | (2006.01) |
| F25B 13/00 | (2006.01) |
| G01K 7/42 | (2006.01) |
| F25B 49/02 | (2006.01) |
| F04B 49/06 | (2006.01) |

(52) U.S. Cl.
CPC ............ *F04C 28/08* (2013.01); *F04C 28/28* (2013.01); *G06F 1/206* (2013.01); *G01K 1/026* (2013.01); *F04C 2270/86* (2013.01); *F04B 2207/03* (2013.01); *F25B 13/00* (2013.01); *F04C 2270/18* (2013.01); *G01K 7/42* (2013.01); *F25B 49/02* (2013.01); *F04B 2201/0801* (2013.01); *F04B 2205/05* (2013.01); *F04C 2270/195* (2013.01); *F04C 2270/46* (2013.01); *F04B 49/065* (2013.01)
USPC ............. 702/130; 702/99; 702/138; 702/181; 62/115; 417/14

(58) Field of Classification Search
CPC ........... G01K 7/42; G06F 1/206; F25B 49/02; F25B 13/00
USPC ........................ 702/99, 130, 138, 181; 62/115
See application file for complete search history.

(56) References Cited

U.S. PATENT DOCUMENTS

| | | | |
|---|---|---|---|
| 4,362,462 A | 12/1982 | Blotenberg | |
| 4,431,390 A | 2/1984 | Hart | |
| 4,627,483 A * | 12/1986 | Harshbarger et al. | ......... 237/2 A |
| 5,114,315 A | 5/1992 | Kaltenthaler et al. | |

(Continued)

FOREIGN PATENT DOCUMENTS

| | | |
|---|---|---|
| EP | 0078149 | 5/1983 |
| EP | 1475586 | 11/2004 |

(Continued)

OTHER PUBLICATIONS

Extended European Search Report for Application No. 12168437.7 dated Jul. 31, 2014 (8 pages).

*Primary Examiner* — Sujoy Kundu
*Assistant Examiner* — Paul D Lee
(74) *Attorney, Agent, or Firm* — Michael Best & Friedrich LLP

(57) ABSTRACT

A method for calculating the probability of moisture build-up in a compressor includes the steps of sensing a temperature of the ambient air, sensing a discharge pressure of the compressor, sensing a temperature of the compressor, processing the ambient air temperature and operating pressure sensed to obtain a required temperature at which condensation will form, and comparing the temperature of the compressor to the required temperature.

16 Claims, 2 Drawing Sheets

(56) References Cited

U.S. PATENT DOCUMENTS

| | | | |
|---|---|---|---|
| 5,235,148 A * | 8/1993 | Yamaguchi et al. | 219/707 |
| 5,950,443 A | 9/1999 | Meyer et al. | |
| 6,394,758 B1 | 5/2002 | Lee et al. | |
| 6,471,486 B1 * | 10/2002 | Centers et al. | 417/18 |
| 6,755,035 B1 | 6/2004 | McNamara et al. | |
| 7,079,938 B2 | 7/2006 | Bhargava et al. | |
| 2001/0032626 A1 * | 10/2001 | Fabre | 123/520 |
| 2004/0217180 A1 | 11/2004 | Lu | |
| 2008/0082218 A1 | 4/2008 | Fornof | |
| 2008/0292471 A1 * | 11/2008 | Sweet et al. | 417/32 |
| 2009/0252632 A1 | 10/2009 | Daniels et al. | |
| 2010/0303644 A1 * | 12/2010 | Moriyama et al. | 417/228 |

FOREIGN PATENT DOCUMENTS

| | | |
|---|---|---|
| JP | 62191678 | 8/1987 |
| JP | 01036987 | 2/1989 |
| JP | 10266994 | 10/1998 |
| JP | 2003-206864 | 7/2003 |
| WO | 94/21921 | 9/1994 |

* cited by examiner

METHOD FOR CALCULATING THE PROBABILITY OF MOISTURE BUILD-UP IN A COMPRESSOR

BACKGROUND

The present invention relates to a system and method for inhibiting moisture build-up in compressors. More specifically, the invention relates to a system and method for predicting the likelihood of moisture build-up within a compressor and controlling operation to reduce the likelihood of moisture build-up in the compressor.

Fluid compressors for compressing fluids containing water, such as ambient air, can have water build up inside the compressor which can lead to corrosion of the internal compressor components. The problem of water build up is more pronounced in some compressors, such as oil-flooded rotary screw air compressors, because the water can be distributed throughout the oil system.

SUMMARY

In one embodiment, the invention provides a method for calculating the probability of moisture build-up in a compressor. The method includes the steps of sensing a temperature of the ambient air, sensing a discharge pressure of the compressor, sensing a temperature of the compressor, processing the ambient air temperature and operating pressure sensed to obtain a required temperature at which condensation will form, and comparing the temperature of the compressor to the required temperature.

In another embodiment the invention provides a method for inhibiting water condensation in a compressor. The method includes the steps of sensing a temperature of the ambient air, sensing an operating pressure of the compressor, sensing a temperature of the compressor, processing the ambient air temperature and operating pressure sensed to obtain a required temperature at which condensation will form. The method also includes the steps of comparing the required temperature to the sensed temperature of the compressor, adjusting a moisture register variable in response to the comparison, and varying the operation of the compressor when the required temperature is lower than the sensed compressor temperature to increase the compressor temperature.

The present invention provides an air compression system which includes an air compressor including an ambient air inlet and a compressed fluid discharge, the compressor operable to draw in ambient air via the ambient air inlet and to discharge compressed air via the discharge. The air compression system also includes a variable speed prime mover operable between a low non-zero speed and a high speed to drive the air compressor, an ambient air temperature sensor positioned to measure the temperature of the ambient air, and a discharge temperature sensor positioned to measure a temperature indicative of an air compressor operating temperature. In addition, the air compression system has a pressure sensor positioned to measure a pressure indicative of an operating pressure of the compressor, and a controller operable at a predetermined frequency to sample the measured ambient air temperature and the measured pressure and use those values to calculate a required temperature, wherein the controller compares the required temperature to the measured operating temperature and varies a moisture register variable in response to the comparison.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
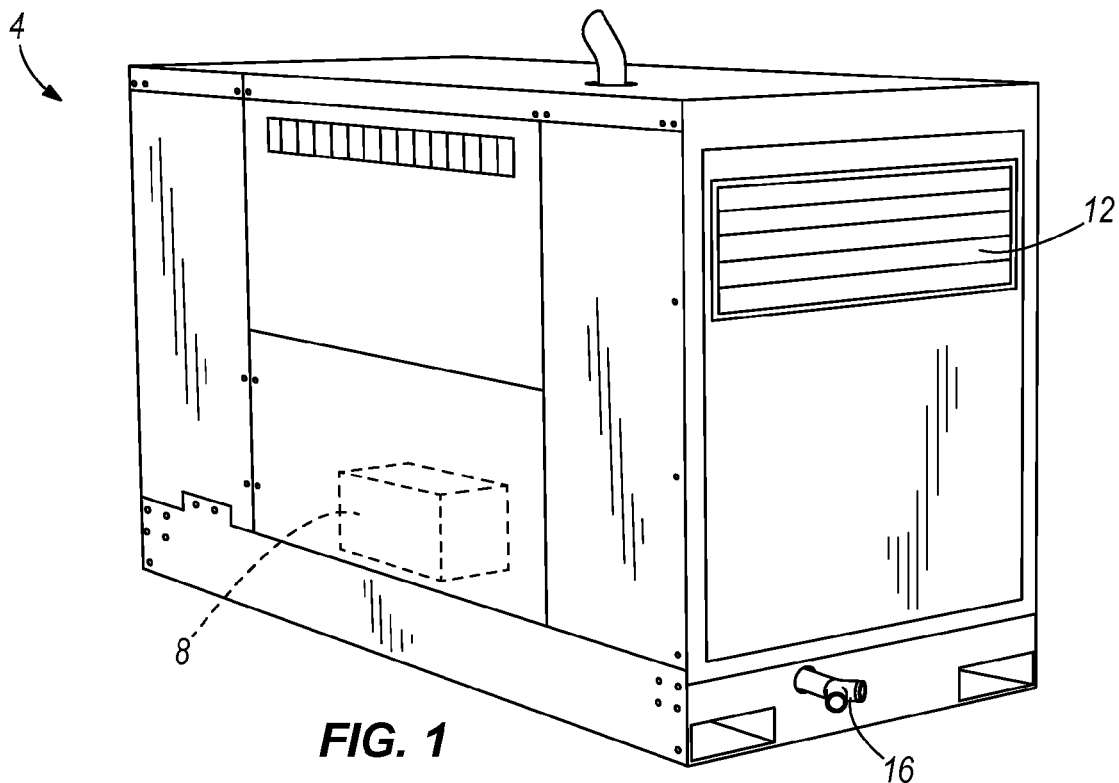
FIG. 1 is a perspective view of a compressor.

Air compression systems used to compress ambient air, such as an air compression system 4 illustrated in FIG. 1, may have the water in the ambient air condense during the compression process, which can lead to corrosion of internal compressor components. The condensation can be more severe when the compressor has been running for a short period because the compressor components may be below normal operating temperatures, thereby increasing the likelihood of condensation. Running the air compression system for a period of time will inhibit the problem of water condensation in the compressor because the compressor components will heat up above the dew point of the air being compressed.

Figure 2:
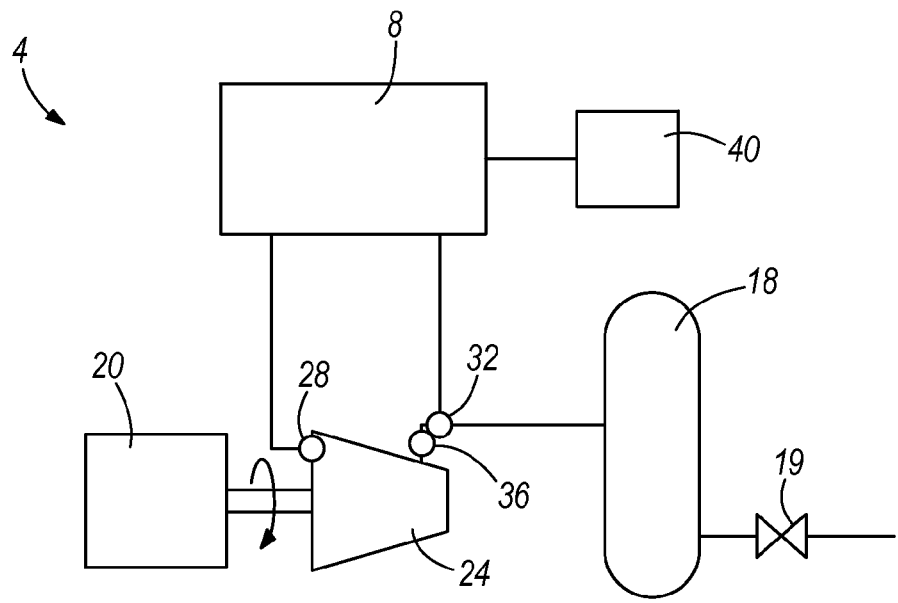
FIG. 2 is a schematic view of the compressor of FIG. 1.

The air compression system 4 of FIG. 1 includes a controller 8 which is used to determine whether liquid water may be present in the air compression system 4. The controller 8 may also be used to operate the air compression system 4 and to provide an interface with an operator. The air compression system 4 also includes an air intake 12 and a compressed fluid discharge 16. Some embodiments may include a compressed fluid reservoir 18 and a control valve 19. Shown in schematic view in FIG. 2, the air compression system further includes a variable speed prime mover 20, an air compressor 24, an ambient air temperature sensor 28, a compressor temperature sensor 32, and a compressor operating pressure sensor 36.

In one embodiment, the ambient air sensor 28 is placed near the air intake 12 of the air compression system 4 to measure the temperature of the ambient air. The compressor temperature sensor 32 measures the actual air compressor temperature (actual CT) by measuring the temperature of internal components of the air compressor 24. In another embodiment, the compressor temperature sensor 32 measures the temperature of compressed fluid, such as air, or oil, at the compressed fluid discharge 16 as it has been found that the temperature of the discharged compressed fluid approximates the temperature of internal components of the air compressor 24. The compressor operating pressure sensor 36 measures the operating pressure of the air compressor 24. In one embodiment the compressor operating pressure sensor 36 measures the pressure of the compressed fluid at a point immediately adjacent to the compressed fluid discharge 16. The measured ambient air temperature, compressor temperature, and compressor operating pressure are sent to the controller 8.

Figure 3:
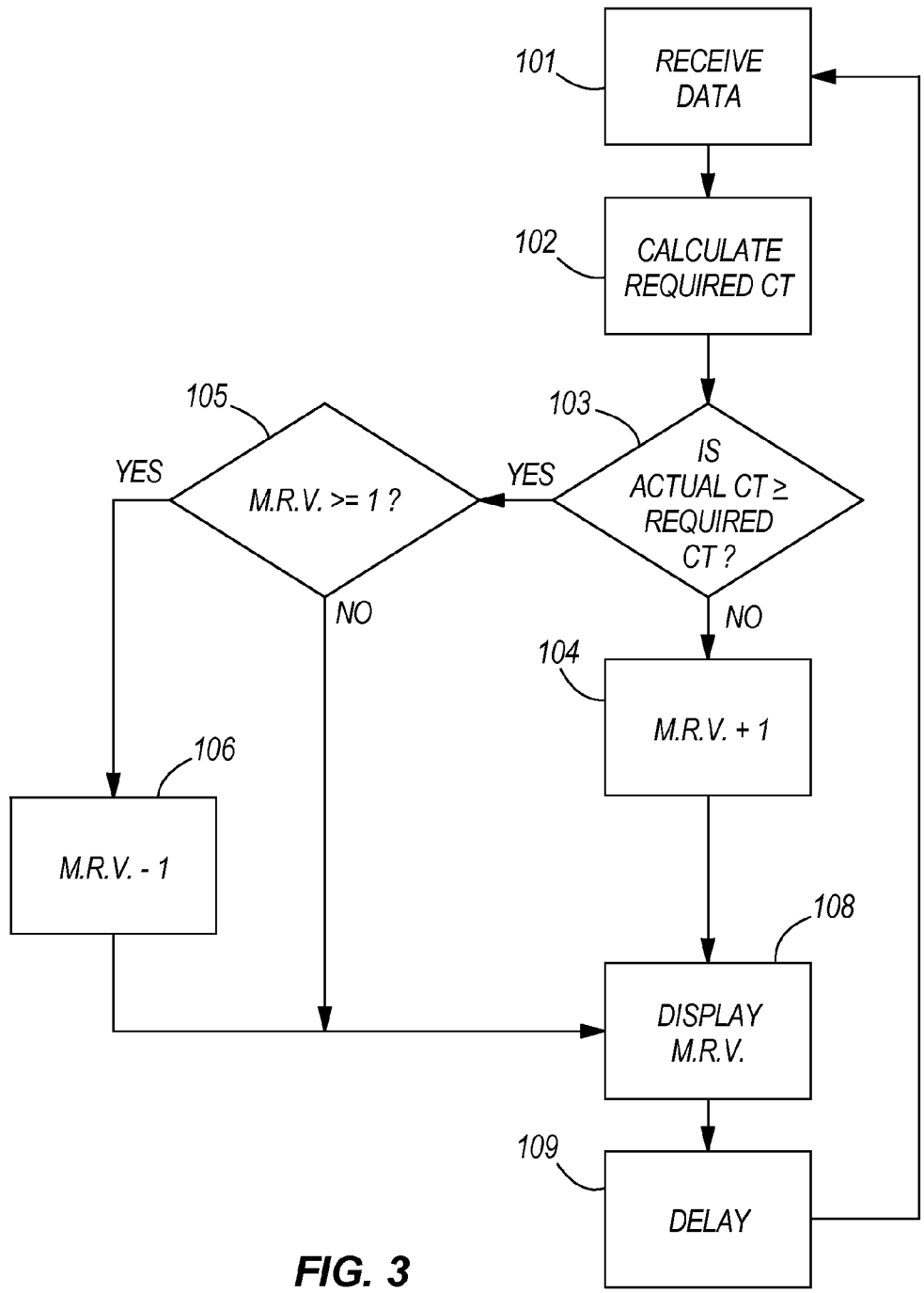
FIG. 3 is a flow chart of an algorithm for a controller.

The flow chart of FIG. 3 illustrates the steps the controller 8 takes to determine whether liquid water may be present in the air compressor 24. In one embodiment, the controller 8 performs the steps shown in the flow chart once each minute.

Other embodiments contemplate performing the steps shown in the flow chart more or less often.

As shown in block 101, the controller 8 first communicates with the ambient air temperature sensor 28, the compressor temperature sensor 32, and the compressor operating pressure sensor 36 to receive the ambient air temperature, the compressor temperature, and the compressor operating pressure.

The controller 8 calculates a required compressor temperature (required CT) to prevent condensation in the air compressor 24, as shown in block 102. The controller 8 uses a formula that is specific to each model of air compressor. In one embodiment, the controller 8 uses the following formula:

$$\text{Required CT} = 80 + AT + 0.13 * CP$$

where required CT is the required compressor temperature in degrees Fahrenheit, AT is the sensed ambient air temperature in degrees Fahrenheit, and CP is the sensed compressor pressure in PSIG (pound-force per square inch gauge). The formula disclosed here assumes the air compressor 24 is operating in a very humid environment. In other embodiments the formula may change when the air compressor 24 is used in less humid environments.

As shown in block 103, the controller 8 compares the actual CT to the required CT. If the actual CT is lower than the required CT, then it is probable that liquid water is condensing in the air compressor 24. If the actual CT is equal to or higher than the required CT, then it is probable that liquid water is not condensing in the air compressor 24.

The amount of condensation in the air compressor 24 is likely to increase when the air compressor 24 is running and the actual CT is less than the required CT. The amount of condensation in the air compressor 24 is likely to decrease when the air compressor 24 is running and the actual CT is greater than or equal to the required CT.

A moisture register variable (M.R.V.) is used to signal whether it is probable that condensation exists in the air compressor 24. In one embodiment, the moisture register variable is increased by 1 for each time the controller 8 determines that the actual CT is less than the required CT. In the same embodiment, the moisture register variable is decreased by 1, or remains equal to 0 if the moisture register variable is already 0, for each time the controller 8 determines that the actual CT is greater than or equal to the required CT. In the disclosed embodiment, a higher moisture register variable means that there is a higher probability that condensation exists in the air compressor 24. In another embodiment, a higher moisture register variable means that there may be a larger amount of condensation in the air compressor 24. In yet another embodiment the moisture register variable increase rate and decrease rate is calculated for each model of air compressor based on how quickly the water condenses or evaporates in the selected model of air compressor.

If the actual CT is less than the required CT, then the controller 8 performs the next function. As shown in block 104, the controller 8 adds 1 to the moisture register variable. After finishing, the controller 8 displays the moisture register variable as shown in block 108.

If the actual CT is greater than or equal to the required CT, then the controller 8 does not perform the function shown in block 104. Instead the controller 8 performs the function shown in block 105, that is, the controller 8 determines whether the moisture register variable is greater than or equal to 1.

If the moisture register variable is greater than or equal to one, then the controller 8 performs the function shown in block 106, that is, the controller subtracts 1 from the moisture register variable. After finishing, the controller 8 performs the function shown in block 108.

When performing the function shown in block 105, if the moisture register variable is not equal to or greater than 1, then the controller 8 performs the function shown in block 108.

As shown in block 108, the controller 8 displays the moisture register variable on a display 40. In an alternative embodiment, the moisture register variable is not displayed and instead is used by the controller 8 to keep the air compressor 24 on or allow the air compressor 24 to be turned off by the operator.

The controller 8 then waits during a delay period, as shown in block 109. In one embodiment the delay period is 1 minute. After the delay period, the controller 8 begins again by performing the function shown in block 101. In other embodiments, the controller 8 may wait more or less than 1 minute before performing the function shown in block 101.

In an alternative embodiment the calculation method for determining the moisture register variable can be modified to correspond to the probability that a greater or lesser amount of liquid water is condensing in the air compressor 24. For example, if the sensed compressor temperature is much lower than the required compressor temperature (i.e. the temperature necessary to prevent condensation) then the moisture register variable may increase at a faster rate. As the air compressor 24 approaches the required compressor temperature, the moisture register may increase at a relatively slower rate.

In yet another embodiment the controller 8 receives the moisture register variable and is programmed to operate the air compression system 4 in a manner that will rapidly increase the air compressor temperature when the moisture register variable is above a set limit.

In another alternative embodiment the relative humidity of the ambient air is sensed by a relative humidity sensor and the formula used by the controller 8 to determine required CT may be adjusted depending on the level of relative humidity sensed.

In another embodiment, the controller 8 records the moisture register variable and time upon air compression system shutdown to determine the likelihood and severity of corrosion. For example, if the air compression system 4 is shut down with a high moisture register variable, liquid water is likely present in the air compressor 24. As time elapses, this water may continuously damage internal components. By monitoring the elapsed time and the moisture register variable, the controller 8 could be programmed to automatically alert the operator that additional steps should be taken to remove the moisture, such as operating the air compression system 4 until the moisture register variable is reduced.

In another embodiment the moisture register variable could be used by the manufacturer to set air compression system operating parameters and maintenance intervals. The controller 8 can record the moisture register variable over time in order to assist the manufacturer or user in determining whether the air compression system 4 has been used within the specified operating parameters. In yet another embodiment the moisture register variable is used to determine a start-up procedure for the air compression system 4 or to define a warm-up period.

Thus, the invention provides, among other things, a method for calculating the probability of moisture build up in an air compression system. Various features and advantages of the invention are set forth in the following claims.

What is claimed is:

1. A method for calculating the probability of moisture build-up in a compressor, said method comprising the steps of:
   sensing a temperature of the ambient air;
   sensing a discharge pressure of the compressor;
   sensing a temperature of the compressor;
   processing the ambient air temperature and the discharge pressure sensed with a controller to obtain a required temperature at which condensation will form;
   comparing the temperature of the compressor to the required temperature;
   calculating a moisture register variable which depends on the comparison of the temperature of the compressor to the required temperature; and
   adding a value to the moisture register variable when the temperature of the compressor is less than the required temperature.

2. The method of claim 1, further comprising displaying the moisture register variable.

3. The method of claim 1, further comprising operating the compressor until the moisture register variable reaches a preset value.

4. The method of claim 1, further comprising subtracting a value from the moisture register variable when the temperature of the compressor is greater than or equal to the required temperature.

5. A method for inhibiting water condensation in a compressor, said method comprising the steps of:
   sensing a temperature of the ambient air;
   sensing an operating pressure of the compressor;
   sensing a temperature of the compressor;
   processing the ambient air temperature and operating pressure sensed with a controller to obtain a required temperature at which condensation will form;
   comparing the required temperature to the sensed temperature of the compressor;
   adjusting a moisture register variable in response to the comparison;
   varying the operation of the compressor when the required temperature is higher than the sensed compressor temperature to increase the compressor temperature; and
   providing a signal to an operator when the moisture register variable is greater than a preset value.

6. The method of claim 5, further comprising displaying the moisture register variable.

7. The method of claim 6, further comprising recording the moisture register variable when the compressor is shutdown.

8. The method of claim 5, further comprising operating the compressor until the moisture register variable reaches a preset value.

9. A method for inhibiting water condensation in a compressor, said method comprising the steps of:
   sensing a temperature of the ambient air;
   sensing a operating pressure of the compressor;
   sensing a temperature of the compressor;
   processing the ambient air temperature and operating pressure sensed with a controller to obtain a required temperature at which condensation will form;
   comparing the required temperature to the sensed temperature of the compressor;
   adjusting a moisture register variable in response to the comparison;
   varying the operation of the compressor when the required temperature is higher than the sensed compressor temperature to increase the compressor temperature; and
   adding a value to the moisture register variable when the temperature of the compressor is less than the required temperature.

10. The method of claim 9, further comprising subtracting a value from the moisture register variable when the temperature of the compressor is greater than or equal to the required temperature.

11. An air compression system comprising:
    an air compressor including an ambient air inlet and a compressed fluid discharge, the compressor operable to draw in ambient air via the ambient air inlet and to discharge compressed air via the discharge;
    a variable speed prime mover operable between a low non-zero speed and a high speed to drive the air compressor;
    an ambient air temperature sensor positioned to measure the temperature of the ambient air;
    a discharge temperature sensor positioned to measure a temperature indicative of an air compressor operating temperature;
    a pressure sensor positioned to measure a pressure indicative of an operating pressure of the compressor;
    a controller operable at a predetermined frequency to sample the measured ambient air temperature and the measured pressure and use those values to calculate a required temperature, wherein the controller compares the required temperature to the measured operating temperature and varies a moisture register variable in response to the comparison, wherein the controller adds a value to the moisture register variable when the sensed compressor temperature is less than the required temperature.

12. The air compression system of claim 11, further comprising a display operable to display the moisture register variable.

13. The air compression system of claim 12, wherein the controller records the moisture register variable upon air compression system shutdown.

14. The air compression system of claim 11 wherein the controller varies the operation of the air compression system when the required temperature is higher than the sensed compressor temperature to increase the compressor temperature.

15. The air compression system of claim 11 wherein the controller operates the air compression system until the moisture register variable reaches a preset value.

16. The air compression system of claim 11 wherein the controller subtracts a value from the moisture register variable when the sensed compressor temperature is greater than or equal to the required temperature.

* * * * *